US009278420B2

(12) United States Patent
McGlasson et al.

(10) Patent No.: US 9,278,420 B2
(45) Date of Patent: Mar. 8, 2016

(54) PROBE MECHANISM FOR MACHINE TOOL

(75) Inventors: William D. McGlasson, Caledonia, NY (US); Kenneth E. Glasow, Spencerport, NY (US)

(73) Assignee: THE GLEASON WORKS, Rochester, NY (US)

(*) Notice: Subject to any disclaimer, the term of this patent is extended or adjusted under 35 U.S.C. 154(b) by 700 days.

(21) Appl. No.: 13/496,896

(22) PCT Filed: Sep. 30, 2010

(86) PCT No.: PCT/US2010/050809
§ 371 (c)(1),
(2), (4) Date: Mar. 19, 2012

(87) PCT Pub. No.: WO2011/041477
PCT Pub. Date: Apr. 7, 2011

(65) Prior Publication Data
US 2012/0179287 A1    Jul. 12, 2012

Related U.S. Application Data

(60) Provisional application No. 61/247,652, filed on Oct. 1, 2009.

(51) Int. Cl.
| G06F 19/00 | (2011.01) |
| B23Q 17/20 | (2006.01) |
| B23F 23/12 | (2006.01) |
| B23Q 7/04  | (2006.01) |

(52) U.S. Cl.
CPC ............ *B23Q 17/20* (2013.01); *B23F 23/1218* (2013.01); *B23Q 7/045* (2013.01); *B23Q 2230/002* (2013.01)

(58) Field of Classification Search
USPC .............................. 700/193; 33/561; 318/646
See application file for complete search history.

(56) References Cited

U.S. PATENT DOCUMENTS

| 5,245,759 | A | * | 9/1993 | Pearson ......................... 33/638 |
| 2003/0123802 | A1 | * | 7/2003 | Richard et al. ................. 385/47 |
| 2005/0043849 | A1 | * | 2/2005 | Coleman et al. ............. 700/195 |
| 2005/0172506 | A1 | * | 8/2005 | Collingwood et al. ......... 33/561 |
| 2007/0210740 | A1 | * | 9/2007 | Sato et al. ..................... 318/646 |
| 2009/0042281 | A1 | * | 2/2009 | Chang et al. ............... 435/287.2 |

FOREIGN PATENT DOCUMENTS

| DE | 19959393 A1 | 8/2000 |
| EP | 2062685 A1 | 5/2009 |
| WO | 91/16673 A1 | 10/1991 |

OTHER PUBLICATIONS

International Search Report and Written Opinion for PCT/US2010/050809.

* cited by examiner

*Primary Examiner* — Robert Fennema
*Assistant Examiner* — Anthony Whittington
(74) *Attorney, Agent, or Firm* — Robert L. McDowell

(57) ABSTRACT

A contacting or non-contacting probe (2) is mounted to a spindle (6), preferably a tool spindle, of a machining device, such as a chamfering device (4), whereby it has a home position retracted out of the way of the machining (e.g. chamfering) process and an active position where it can contact a workpiece before or after the machining (e.g. chamfering) process.

14 Claims, 5 Drawing Sheets

PROBE MECHANISM FOR MACHINE TOOL

FIELD OF THE INVENTION

The present invention is directed to machine tools such as machines for manufacturing gears and other toothed articles. In particular, a probe mechanism for such machine tools is disclosed.

BACKGROUND OF THE INVENTION

Probe mechanisms of the contacting and non-contacting types on machine tools are known for performing a variety of functions. Workpieces may be probed before machining to determine the amount of stock removal necessary to attain a desired dimension. Workpieces may be probed after machining to verify final dimensions. Additionally, machine tool probes may be used to calibrate the machine or to monitor the form or dimensions of a tool.

In gear manufacturing machines, one or more on-machine probes are known for performing operations such as machine calibration and/or stock dividing. Stock dividing is the proper positioning of a partially finished (e.g. cut) gear relative to a tool (e.g. grinding wheel) prior to the initiation of a finishing cycle (e.g. grinding). For example, U.S. Pat. No. 5,297,055 discloses contacting and non-contacting probes for workpiece probing and machine calibration wherein the probes reside on an articulated arm that is swung into and out of position. Other arrangements are known wherein a cylinder or telescoping device is utilized to advance and retract a probe to and from a working position.

However, with positioning devices such as articulated arms or telescope-like cylinders, positioning accuracy and repeatability may be inconsistent. Furthermore, as the trend in the industry is toward more compact machines, the compactness of systems on a machine, including the probing system, is likewise in need of being addressed. Additionally, simplification of probing systems is also desirable, for example, by a reduction in the number of controlled axes motions that are necessary for operation of the probing system.

SUMMARY OF THE INVENTION

A contacting or non-contacting probe is mounted to a spindle, preferably a tool spindle, of a machining device, such as a chamfering device, whereby it has a home position retracted out of the way of the machining (e.g. chamfering) process and an active position where it can contact a workpiece before or after the machining (e.g. chamfering) process.

DETAILED DESCRIPTION OF THE PREFERRED EMBODIMENT

Figure 1:
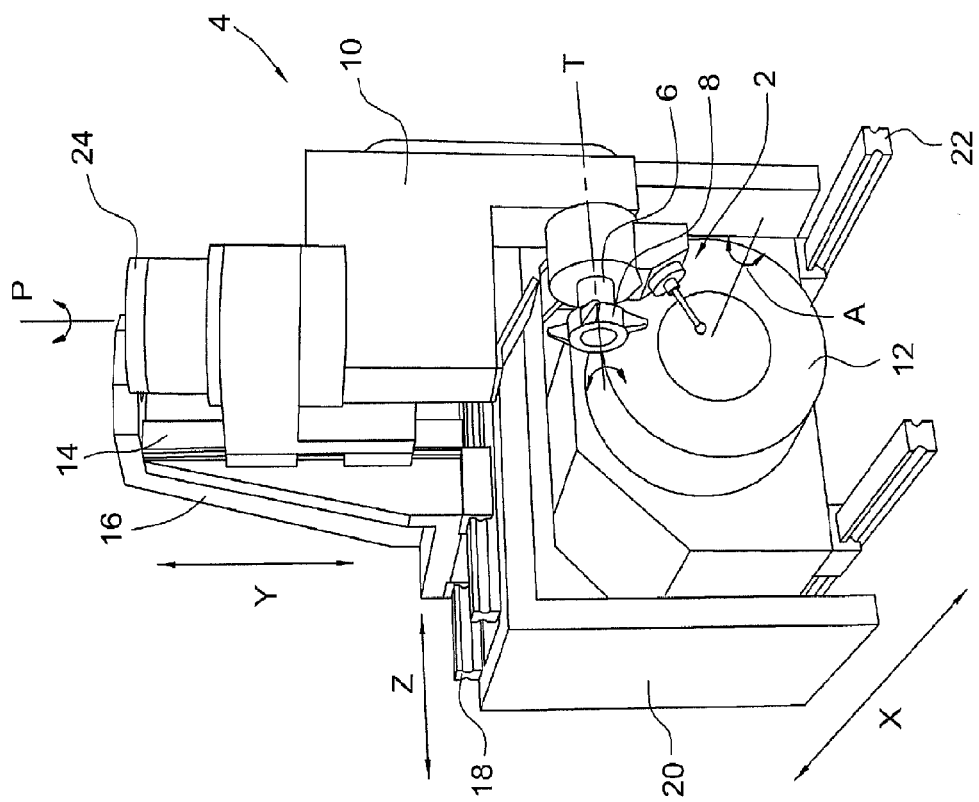
FIG. 1 illustrates a type of machine tool with the inventive probe mechanism in its home position.

Before any features and at least one construction of the invention are explained in detail, it is to be understood that the invention is not limited in its application to the details of construction and the arrangements of the components set forth in the following description or illustrated in the drawings. The invention is capable of other constructions and of being practiced or being carried out in various ways. Also, it is understood that the phraseology and terminology used herein is for the purposes of description and should not be regarded as limiting.

The use of "including", "having" and "comprising" and variations thereof herein is meant to encompass the items listed thereafter and equivalents thereof as well as additional items. Although references may be made below to directions such as upper, lower, upward, downward, rearward, bottom, top, front, rear, etc., in describing the drawings, there references are made relative to the drawings (as normally viewed) for convenience. These directions are not intended to be taken literally or limit the present invention in any form. In addition, terms such as "first", "second", "third", etc., are used to herein for purposes of description and are not intended to indicate or imply importance or significance.

With the present invention, a contacting or non-contacting probe is mounted to a machining device, such as a chamfering device, whereby it has a home position retracted out of the way of the machining (e.g. chamfering) process and an active position where it can contact a workpiece before or after the machining (e.g. chamfering) process.

Figure 2:
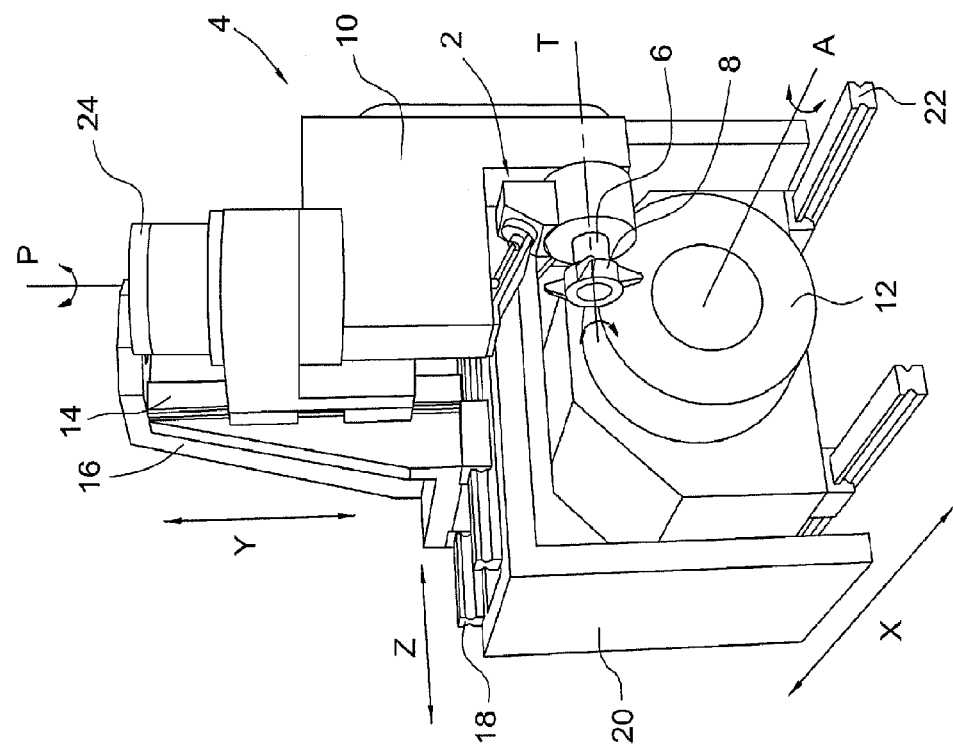
FIG. 2 illustrates the machine tool of FIG. 1 wherein the inventive probe mechanism is in its working position.

FIG. 1 and FIG. 2 show a probe mechanism 2 according to the present invention wherein the probe mechanism 2 is mounted on a machining device 4, such as a chamfering device, which may be an independent machine or form a part of another machine, such as a gear cutting or grinding machine of the type disclosed in U.S. Pat. Nos. 6,669,415 and 6,712,566, the disclosures of which are hereby incorporated by reference. Probe mechanism 2 is positioned on a spindle 6 of a machining tool 8 which in FIG. 1 is a chamfering tool, preferably a chamfering tool for gears or other toothed articles. FIG. 1 shows probe mechanism 2 in a retracted position while FIG. 2 shown probe mechanism in an active position.

In the preferred embodiment, the machining device 4 of FIG. 1 or FIG. 2 comprises a chamfering and deburring apparatus having a tool head 10, spindle 6 and tool 8, such as a chamfering and deburring tool, which is rotatable about a tool axis T. Tool 8 is driven for rotation preferably by a servo motor (not shown) or by direct drive. Tool head 10 is pivotable about a pivot axis P preferably driven by a servo motor (not shown). Tool head 10 is movable in a first linear direction, Y, along rails 14 mounted to a column 16 with the linear motion being driven preferably by a servo motor (not shown). Column 16, and hence tool head 10, is movable in a second linear direction, Z, preferably via a servo motor (not shown). Column 16 is movable on rails 18 mounted to frame 20. Frame 20 may be movable in a third linear direction, X, such as on rails (not shown) via hydraulic piston or servo motor (not shown).

Spindle 12 is driven for rotation about axis A preferably by a servo motor (not shown). Preferably, spindle 12 is linearly movable in direction X on rails 22 via a servo motor (not shown). Alternatively, spindle 12 may be direct driven. Preferably, directions X, Y and Z are mutually perpendicular with respect to one another although one or more may be inclined with respect to its perpendicular orientation. For purposes of illustration, in all Figures, the Y direction is vertical.

Movement of the tool head 10 in direction Y, column 16 in direction Z, spindle 12 in direction X, pivoting of tool head 10 about axis P, as well as tool 8 rotation about axis T and spindle 12 rotation about axis A, is imparted by the separate drive motors (not shown). The above-named components are capable of independent movement with respect to one another or may move simultaneously with one another. Each of the respective motors is preferably associated with a feedback device such as a linear or rotary encoder, such as pivot axis encoder 24, as part of a computer numerically controlled (CNC) system which governs the operation of the drive motors in accordance with instructions input to a computer controller (i.e. CNC) such as a Fanuc model 30i (not shown).

Figure 3:
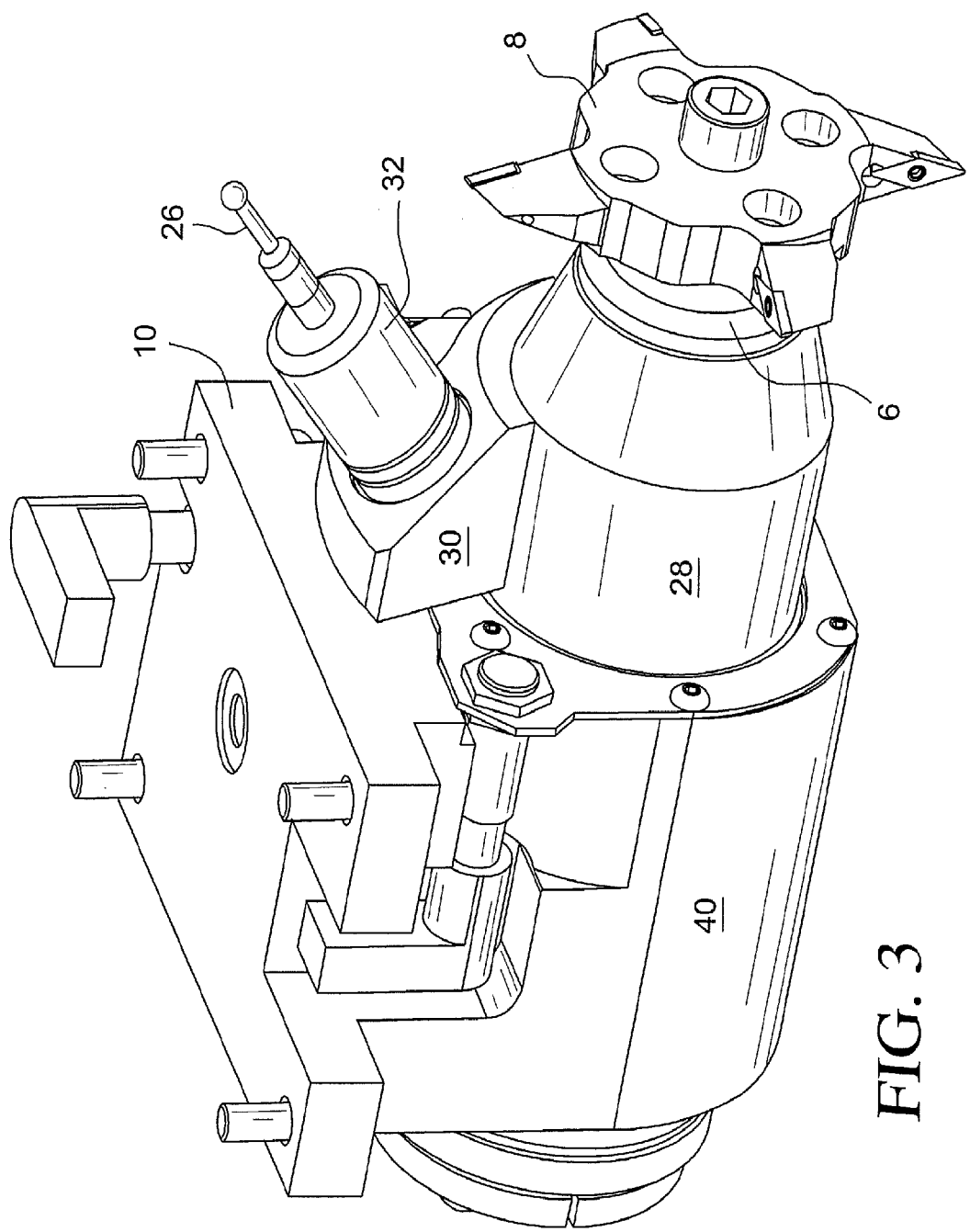
FIG. 3 is an enlarged view of a machine tool spindle with the inventive probe mechanism positioned thereon.
Figure 4:
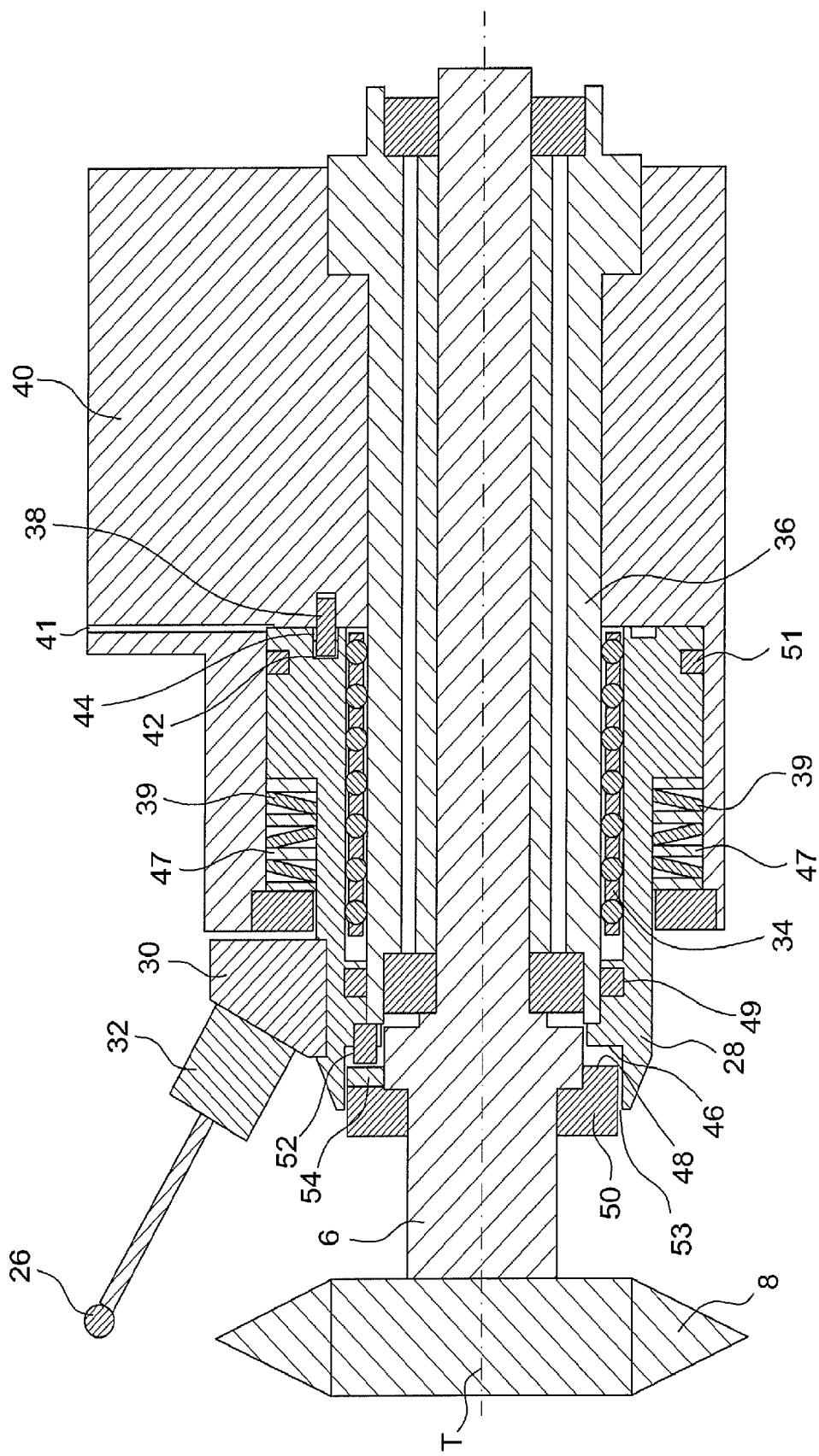
FIG. 4 is a cross-sectional view of the inventive probe mechanism in its retracted position.

Details of the inventive probing mechanism 2 are shown in FIGS. 3-6. FIG. 3 shows the general inventive structure comprising a contacting-type probe 26 mounted to an outer spindle 28 via a probe head 30 and probe base 32. As seen in FIG. 4, the outer spindle 28 holds the probe 26 and is preferably built on a ball-sleeve 34 around an inner spindle housing or nose 36. The inner spindle 6 carries the chamfering cutter 8 and is driven by a motor directly or via a drive train. The outer spindle 28 is displaceable axially in the direction of axis T and rotationally about axis T. When axially retracted, due to the force of springs 39 (preferably two or more) such as Belleville springs for example, a pin 38 projecting from the surface 43 (see FIG. 5 or 6) of the non-rotating main spindle housing 40 engages a bore 42, formed in the rearward surface 45 (see FIG. 5 or 6) of the outer spindle 28, which prevents it from rotating.

In this position, the inner spindle 6 turns independently with no connection to the outer spindle 28 as during chamfering. Preferably, an air gap or labyrinth 53 is provided between the outer spindle 28 and the inner spindle 6 with a means to provide air flow moving out of this gap to prevent the influx of debris such as chips, fluids, etc. The source of pressurized air for this airflow can be independent or may be taken from the air passage 41 that advances the air piston.

Figure 5:
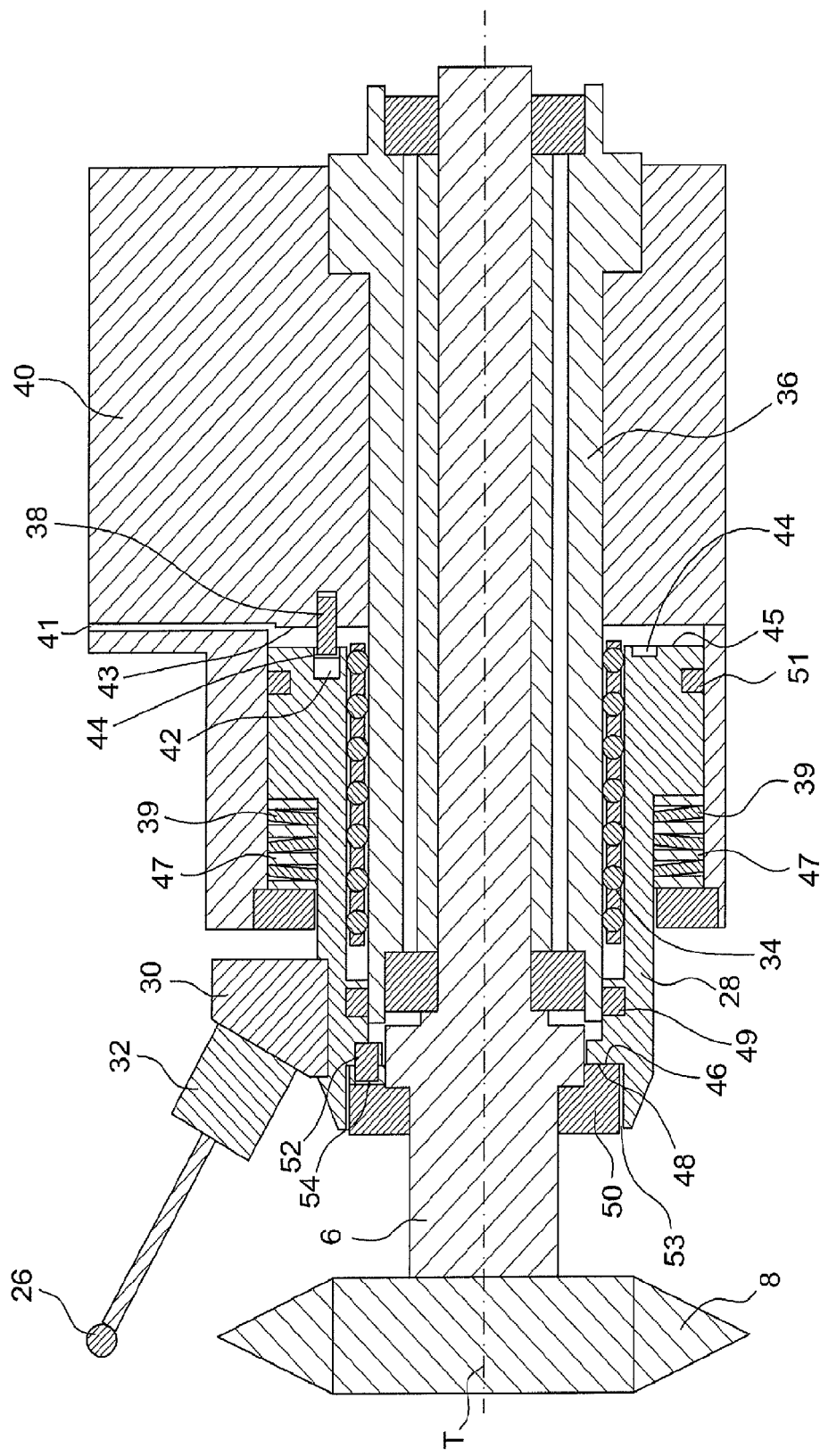
FIG. 5 is a cross-sectional view of the inventive probe mechanism in its advanced position.
Figure 6:
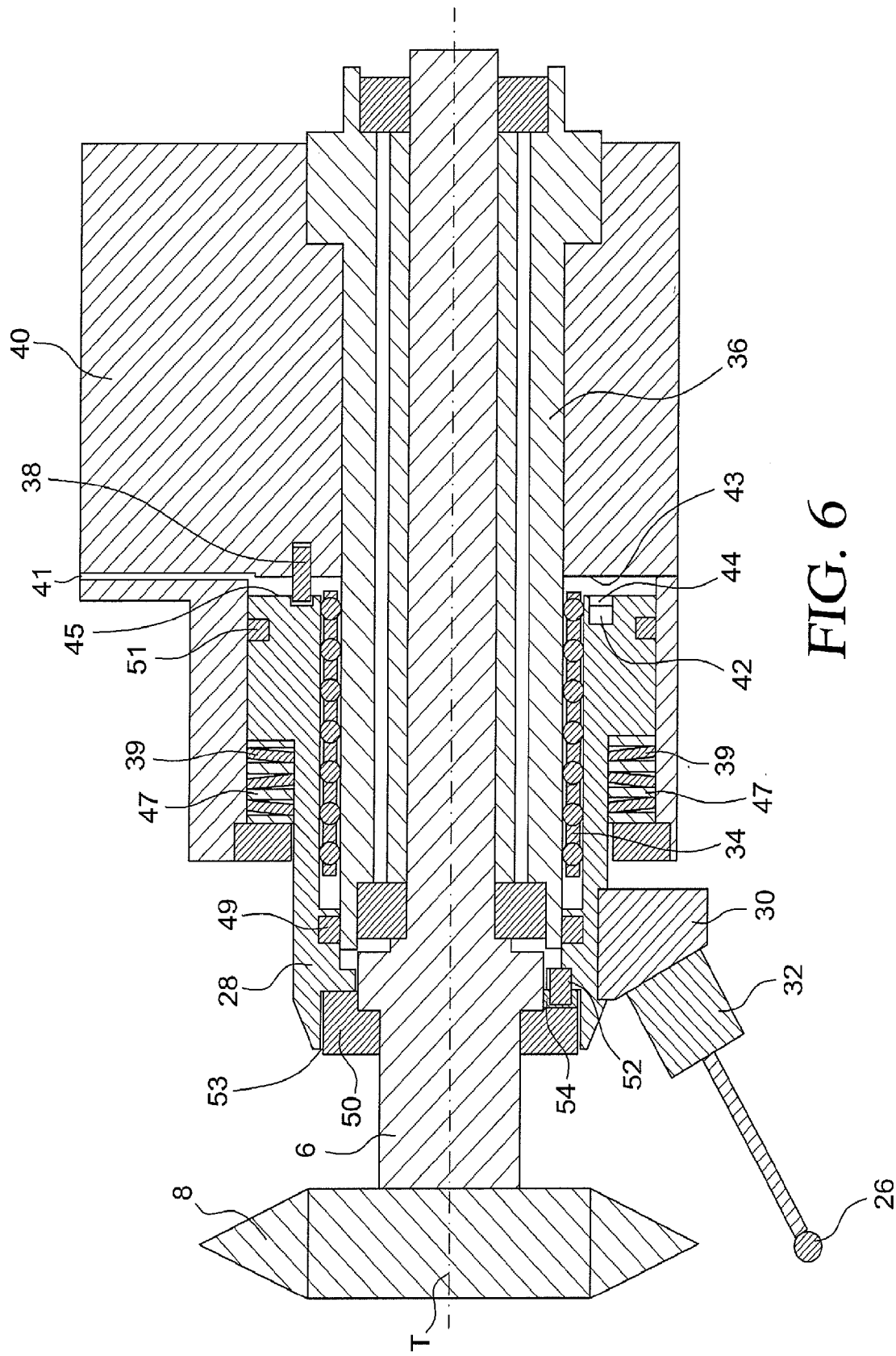
FIG. 6 is a cross-sectional view of the inventive probe mechanism in its working position.

As shown in FIG. 5, outer spindle 28 is axially advanced, such as by introducing pressurized air (or other fluid) via passage 41 to the interface between outer spindle 28 and main spindle housing 40. Under pressure, outer spindle 28 serves as an air piston to compress springs 39 and disengage pin 38 from bore 42. Ball sleeve 34 may move axially along with outer spindle 28. Seals 49 and 51 help maintain pressure in the air piston and also move axially along with outer spindle 28. Outer spindle 28 then becomes free to rotate. The pin 38, free from the bore 42, still extends into a slot 44 in the outer spindle 28 so that the rotational motion of outer spindle 28 is bounded by the ends of the slot. For example, slot 44 is arcuate in shape and extends by some predetermined amount, such as 180 degrees. Forward axial motion of outer spindle 28 is limited when a stop surface 46 of the outer spindle 28 makes contact with an internal surface 48 of an axial hard stop 50 which is part of the rotating inner spindle 6. Moreover, in this position, forward pins or keys 52 on the outer spindle 28 engage slots 54 (or similar features) of the inner spindle 6 so that the two spindles become locked together rotationally. In this condition, outer spindle 28 rotates along with inner spindle 6 but the pin 38 is still engaged in the outer spindle slot 44 to effect a travel limit (e.g. 180 degrees) in both directions of rotation about axis T.

Inner spindle 6 may be pre-positioned at a known engagement position such that when air pressure is applied to advance outer spindle 28, the forward pins or keys 52 of the outer spindle 28 will be in a position to properly align with the slots 54 of the inner spindle 6 without axial interference. Proximity switches may be utilized to detect positioning.

When chamfering, probe 26 and outer spindle 28 remain in their home or retracted position, generally above the chamfer spindle (FIG. 1) and out of the way of the chamfering process. The inner or chamfering spindle 6 is employed to produce a chamfer on a workpiece.

To probe the workpiece, the inner spindle 6 is rotated to a defined engagement position and the air pressure is activated to advance the outer spindle 28 into locking engagement with inner spindle 6 as discussed above. Once advanced, the chamfer cutter spindle 6 is rotated, such as by means of its associated NC control, thereby carrying with it the outer spindle 28 and the probe 26 mounted thereto. The two spindles 6, 28, locked rotationally together, turn until the end of travel is reached (FIG. 6) as effected by the internal pin 38 in slot 44. At this position (see FIG. 2 also), preferably with the NC control maintaining a predetermined amount of torque to position the outer spindle 28 against its rotational hard stop in slot 44 and the air pressure maintaining some known force to position the outer spindle 28 against its axial hard stop 48, the probe 26 can be used to engage and measure the workpiece as required utilizing the available motions of the machining device 4. If desired, one or more low friction spacers 47 may be interspersed with springs 39 to facilitate rotation of outer spindle 28 with respect to adjacent stationary components such as those of the main spindle 40.

After probing, the rotationally coupled spindles 6, 28 are rotated back to position the probe mechanism 2 in its home position (FIG. 1). Air pressure is then removed thus allowing springs 39 to expand, thereby uncoupling spindles 6, 28 (by retracting pins or keys 52 from slots 54) and urging outer spindle 28 to return to its retracted position (FIG. 4) wherein pin 38 is inserted into bore 42.

Alternatively, pin 38 may reside in and project from the rearward surface 45 of outer spindle 28 while bore 42 and slot 44 may be formed in surface 43 of the non-rotating main spindle housing 40.

While the invention has been illustrated and discussed with respect to a probing mechanism arranged about the spindle of a chamfering device, the present invention is not limited thereto. For example, the inventive probing mechanism may be positioned about any tool axis, such as a cutting tool axis or a grinding wheel axis, in a multi-axis machine tool whereby a workpiece may be probed before, during and/or after machining. Furthermore, the inventive probing mechanism may be positioned about a workpiece axis in a multi-axis machine tool whereby tool probing may be carried out. Although a contacting type probe has been illustrated, the present invention also contemplates non-contacting type probes positioned on outer spindle 28.

Regardless of the type of machine tool, the present invention eliminates the need for separate motors to advance and position a probe. The mechanical probe advancing mechanism of the invention along with the utilization of the existing tool or workpiece spindle for positioning a probe represents a simpler, less costly and more accurate means to position a probe on a machine tool.

While the invention has been described with reference to preferred embodiments it is to be understood that the invention is not limited to the particulars thereof. The present invention is intended to include modifications which would be apparent to those skilled in the art to which the subject matter pertains without deviating from the spirit and scope of the appended claims.

What is claimed is:
1. A machine tool comprising:
a workpiece spindle for rotation of a workpiece about a workpiece axis;
a tool spindle for rotation of a tool about a tool axis;
a probe mechanism positioned on a probe spindle, said probe spindle being located about at least one of said workpiece spindle and said tool spindle;

said probe spindle being rotatable about the respective axis of rotation of said at least one of said workpiece spindle and said tool spindle;

said probe spindle being movable in the direction of said respective axis of rotation between a retracted position whereby rotation of said probe spindle is prevented, and an advanced position whereby said probe spindle is in engagement with said at least one of said workpiece spindle and said tool spindle and is rotatable therewith.

2. The machine tool of claim 1 wherein said probe spindle is maintained in said retracted position by spring force.

3. The machine tool of claim 2 wherein said probe spindle is displaced to said advanced position via fluid pressure in an amount sufficient to overcome said spring force.

4. The machine tool of claim 3 wherein said fluid pressure comprises air pressure.

5. The machine tool of claim 1 wherein said probe spindle is rotatable about said respective axis by a predetermined amount.

6. The machine tool of claim 5 wherein said predetermined amount is defined between a home position and a probing position.

7. The machine tool of claim 6 further comprising:
said at least one of said workpiece spindle and said tool spindle further including a non-rotatable spindle housing having a forward surface and said probe spindle further including a rearward surface, said forward surface and said rearward surface facing one another;
a pin extending from one of said forward surface and said rearward surface;
a bore of predetermined depth located in the other of said forward surface and said rearward surface;
said pin being inserted into said bore in said retracted position whereby rotation of said probe spindle is prevented.

8. The machine tool of claim 7 wherein in said advanced position, said pin is removed from said bore and resides in and is moveable along an arcuate slot located in the same surface as said bore, said arcuate slot having a first end coincident with said bore and defining said home position and a second end defining said probing position, said arcuate slot being of a shallower depth than said bore.

9. The machine tool of claim 6 further comprising:
said at least one of said workpiece spindle and said tool spindle further including a hard stop having an internal surface and said probe spindle further including a forward stop surface facing said internal surface whereby axial displacement of said probe spindle is stopped by contact between said forward stop surface and said internal surface thereby defining said advanced position.

10. The machine tool of claim 9 further comprising at least one pin or key projecting from one of said forward stop surface and said internal surface and at least one corresponding slot located in the other of said forward stop surface and said internal surface whereby in said advanced position, said at least one pin or key is inserted into said corresponding slot thereby rotationally locking said probe spindle to said at least one of said workpiece spindle and said tool spindle.

11. The machine tool of claim 1 wherein said probe mechanism comprises a contact probe.

12. The machine tool of claim 1 wherein said probe mechanism comprises a non-contact probe.

13. The machine tool of claim 1 further comprising a ball-sleeve positioned between said probe spindle and said at least one of said workpiece spindle and said tool spindle.

14. The machine tool of claim 1 wherein said workpiece spindle and said tool spindle are movable relative to one another linearly along one or more mutually perpendicular axes and angularly about a pivot axis.

\* \* \* \* \*